Sept. 7, 1965 R. D. HEYL 3,204,390
FILTER
Filed Feb. 28, 1962 2 Sheets-Sheet 1
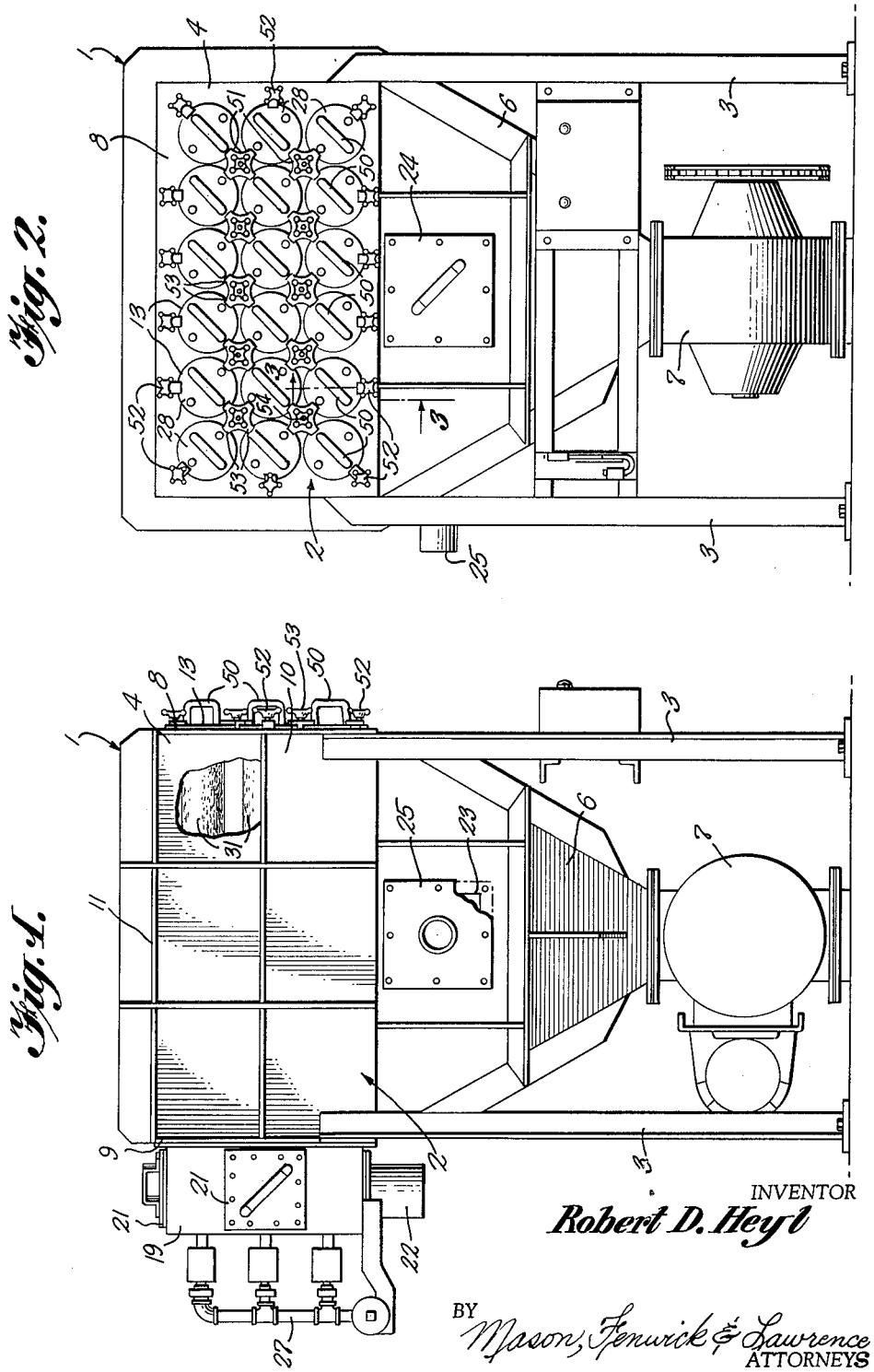
INVENTOR
Robert D. Heyl
BY Mason, Fenwick & Lawrence
ATTORNEYS

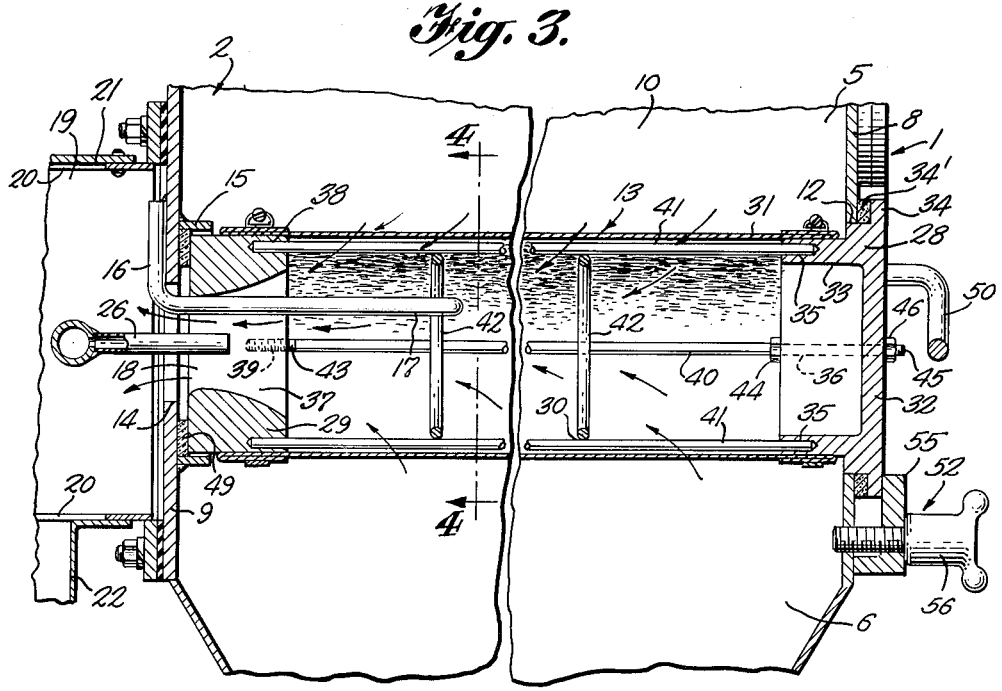
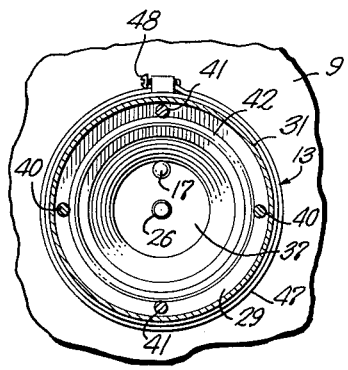
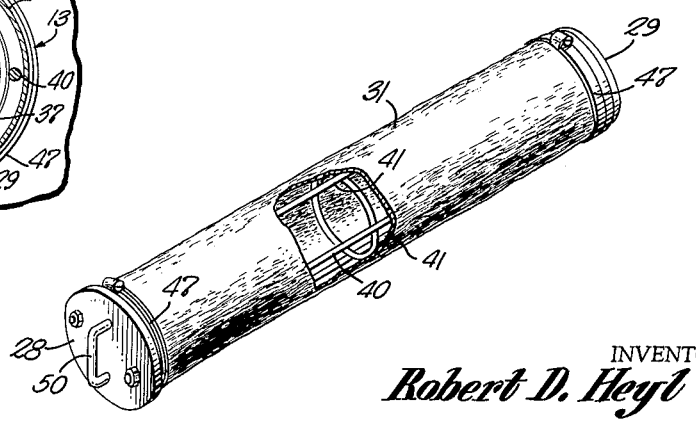

3,204,390
FILTER

Robert D. Heyl, Muncy, Pa., assignor to The Young Machinery Company, Inc., Muncy, Pa., a corporation of Pennsylvania
Filed Feb. 28, 1962, Ser. No. 176,255
7 Claims. (Cl. 55—341)

This invention relates to filters, and more particularly to filter assemblies having improved construction of the filter elements and their mounting in the filter housing.

The general type of filter with which the present invention is concerned is one wherein one or more filter units are mounted in a filter chamber and air or other gaseous conveying media to be filtered is pumped, or drawn, through the chamber and through the walls of the filter element or elements to filter out dust or other air borne materials. The filtered air flows to one end of the filter elements. Usually, means will be supplied to set up back pressure within the filter elements to clean accumulation from the filtering surfaces.

Normally, the filtering elements are in the nature of porous tubes, or socks, mounted on a frame of some kind to hold them extended. The filter elements become dirty, worn and inefficient with use and have to be removed for thorough cleaning, or replacement. With previous filters, this has been a dirty, tedious time-consuming and unpleasant task.

The principal object of the present invention is to provide an improved filter constructed to facilitate removal of the filter elements from the housing.

A more specific object is the provision of a filter wherein the filter elements are accessible from the outside of the housing so that they may be removed without getting into the filter structure.

Another object is to provied filter elements of improved construction to permit quick assembly and disassembly.

It is also an object of the invention to provide a filter having certain of its structural elements adapted for interchange, so that various arrangements may be made to set up the filter in accordance with the requirements of a particular place in which it is to be installed.

Other objects of the invention will become apparent from the following description of one practical embodiment thereof, when taken in conjunction with the drawings which accompany, and form part of, this specification.

In the drawings:

FIGURE 1 is a side elevation of a filter embodying the principles of the present invention;

FIGURE 2 is a front view of the filter shown in FIGURE 1;

FIGURE 3 is an enlarged vertical section through a portion of the device, taken on the line 3—3 of FIGURE 2;

FIGURE 4 is a transverse section through one of the filter elements, taken on the line 4—4 of FIGURE 3; and FIGURE 5 is a perspective view of one of the filter elements removed from the housing, parts being broken away to show the interior.

In general, the invention is concerned with a filter which includes a housing having one or more openings in one side into which specially constructed filters may be inserted, with the filters closing the housing and being self-seating in the housing in filtering position.

Referring to the drawings in detail, there is shown a filter 1 which comprises a housing 2 supported upon legs 3. The housing can take any appropriate shape, and is shown as having a rectangular upper section 4 enclosing a filter chamber 5. The housing sides converge downwardly below the upper section, forming a dust or filtered material discharge hopper 6. If desired, a suitable air lock 7 may be connected to the open bottom of the outlet 6.

The upper section 4 of the housing consists of a front plate 8, back plate 9, side plates 10, and top plate 11. In the embodiment shown, the front plate is provided with a plurality of openings 12 to receive filter elements 13. The openings are preferably arranged in rows for convenience and symmetry. The back plate 9 has a similar number of openings 14, but these are smaller than those on the front. The front and back openings are arranged in axial alignment. A collar 15 is fixed concentrically about each opening in the back plate to form a seat for the back end of the filter element. In order to lead the filter element into its seat, a guide rod 16 is fixed to the rear side of the back place above each opening 14, and each has a horizontal guide tongue 17 projecting through the opening for insertion into the open end 18 of a filter element to guide it into place.

A casing 19 is attached to the back of the housing encompassing all of the openings 14 and forming an outlet manifold for filtered air. The casing has a plurality of identical cut-outs 20 on its various sides to provide inspection openings. These are closed by covers 21 and an outlet plate 22. The cut-outs and plates are identical so that the outlet may be positioned at the most convenient place for the system in which the filter is to be installed.

The filtered material discharge hopper 6 also has a plurality of cut-outs 23, and these are closed by covers 24 and inlet plate 25. Here, again, the inlet plate and covers are interchangeable so that the inlet may be positioned in any one of several locations.

With the above arrangement, air to be cleaned will flow into the filter chamber through inlet plate 25. The air will pass through the filter elements, leaving foreign matter on the surfaces of these elements. The filtered gaseous media will pass out through openings 14 in the back wall into the outlet manifold and out through the outlet plate 22. A jet 26 is positioned centrally through each of the back plate openings 14, and the jets are coupled into a manifold system 27. Air or other cleaning media may be directed into the filter elements to reverse flush the system and blow dust or filtered material accumulations from the filter surfaces. This can be done automatically or manually, as desired.

The filter elements each consist of a closed front cage end 28, and open back cage end 29, a cage frame 30 and a sock, or other filtering medium, 31.

Front cage end 28 is in the form of a cup having a base 32 and an annular rim 33. The base has a projecting flange 34 to seat against the housing front plate 8 when the filtering element is in operative position. A sealing washer 34' may be placed about the rim and interposed between the base flange and the housing front plate. The cage end is drilled in an axial direction to provide a pair of diametrically opposed recesses 35 and a pair of opposed through holes 36 to receive the cage frame ends, as will be described.

The open cage end 29 is ring-shaped, having an outside diameter equal to the outside diameter of the rim 33 of the cage end 28. The inner opening 37 of cage end 29 flares inwardly of the cage, so that filtered air passing out of the filtering element into the outlet manifold will increase in speed. The open cage end will seat in the collar 15 on the housing back wall, and the inner opening will cooperate with the guide rod 16 in leading the filtering element to its seat in the housing. The ring member is drilled from its inner face to provide opposed smooth bore recesses 38, and opposed threaded sockets 39.

The filter cage frame 30 is of skeleton form, consisting of two pairs of support rods 40 and 41, held in spaced, parallel relation by means of one or more frame hoops 42. This will provide an open frame of generally cylindrical formation.

The rods of one pair, 40, are threaded on their ends. One end, 43, of each rod 40 is threaded into one threaded socket 39 of the end cage 29 before the rods are welded to the hoops 42. The companion ends of rods 41 will be seated in the recesses 38 before the welding takes place. After the rods are welded to the hoops, the frame is permanently fixed to the cage 29.

It will be noted from FIGURE 3 that rods 40 are longer than rods 41. This will permit rods 41 to seat in the recesses 35 of the cage end 28, while ends of the longer rods 40 project completely through the holes 36 in that same cage end. Nuts 44 will be screwed on the threaded ends 45 of the rods 40 to provide shoulders against which the cage end 28 may rest. The projecting ends of these rods will receive nuts 46 to secure the cage end to the frame to complete the cage assembly.

The sock 31 is of filter cloth, or other suitable porous material, and is of cylindrical shape to slide over the cage and extend from one cage end to the other. A band type clamp 47 can be used to fix the sock to the cage. The clamps will surround the sock ends overlying the cage ends, and they will be tightened by means of clamping screws 48 to hold the sock in place.

When a filter element is to be placed in the housing, the back cage end 29 is first inserted in the proper opening 12 in the housing front plate and the element slid into place. As the element is inserted while held in a general horizontal position, the guide tongue 17 of guide rod 16 will enter the opening in cage end 29. If the back end of the cage is then lowered so that the inside surface of the cage end rests upon the guide tongue, the tongue will lead the cage into its seat in the collar 15. A washer 49 is permanently seated in the collar to form a seal between the cage and the housing back wall. When the back end of the cage is seated in the collar 15, the front end will be within the opening 12 of the housing front plate to align the cage properly as well as seal against the washer 34'. Handles 50 are provided on the cage ends 28 to facilitate insertion and removal of the cages.

The filter elements are held in position in the housing by means of interior pivoted latches 51 and exterior clip latches 52. Latches 51 are pivoted to the housing front plate centrally in the spaces between four adjacent filter elements. Each latch has four radial latch fingers 53, one to overlie the adjacent edge of each of the four surrounding filter elements. The latches can be swung about their pivots 54 to position the latch finger intermediate the filter elements to release the elements for removal. About the periphery of the filter bank there are a plurality of the clip latches 52, one for each filter element about the perimeter of the filter bank. These latches consist of latch clips 55 to overlie the edge of an adjacent filter element front cage and, clamping bolts 56 which project through openings in the clips and are threaded into the front plate of the housing.

When the filters are to be removed, the adjacent pivoted latches are rotated to remove their latch arms from latching position overlying the filter ends, and the latch clips are released by loosening the bolts and rotating the clips to inoperative position. When the filter elements are replaced, the pivoted latches are rotated to locking position, the clips are turned to overlie the filter ends and the bolts tightened. The filter elements will be firmly held in place.

The above decribed arrangement provides a filter assembly wherein the filter units can be removed and replaced at will, from the outside of the housing. Simply inserting a filter element into an opening in the housing front plate and turning the latches will seat the filter element in proper position and sealed against leakage.

While in the above one practical embodiment of the invention has been disclosed, it will be understood that the structural details described and shown are by way of illustration, and the invention may take other forms within the scope of the appended claims.

What is claimed is:

1. A filter comprising, a housing enclosing a filter chamber, an inlet to the chamber for gas to be filtered, the housing having opposed walls having axial aligned openings therein, an outlet for filtered gas in communication with the opening in one of the housing walls, and a hollow filter element having a closed end and an open end positioned spanning the filter chamber between aligned openings in the opposed housing walls with the open end of the filter element in sealing relation with the housing wall about the opening in communication with the outlet for filtered gas and the closed end seated in the aligned opening in the opposed wall, the filter element being slidable to and from position spanning the filter chamber through the opening in the wall in which the closed end of the filter element is seated.

2. A filter as claimed in claim 1 wherein, there are releasable latching means carried by the housing wall to overlie the filter element to hold the filter element in position spanning the chamber.

3. A filter as claimed in claim 1 wherein, there is guide means attached to the housing positioned to enter the open end of the filter element as the element is inserted in the housing to guide the open end into sealing relation with the housing wall about the opening in communication with the outlet for filtered gas.

4. A filter comprising, a housing enclosing a filter chamber and including front and back walls, an inlet to the chamber for gas to be filtered, the front and back walls each having a plurality of openings therein with each opening in the front wall being in axial alignment with an opening in the back wall to provide aligned pairs of openings, an outlet for filtered gas in communication with the openings in the back wall, and a plurality of hollow filter elements each having an open end and a closed end positioned spanning the filter chamber with the closed ends seated in the openings in the front wall and the open ends in sealing relation about the respective aligned openings in the back wall, the filter elements being slidable to and from positions spanning the filter chamber through the openings in the front wall of the housing.

5. A filter as claimed in claim 4 wherein, there are releasable latching means carried by the housing front wall to engage the closed ends of the filter elements to hold the filter elements in position in the housing.

6. A filter as claimed in claim 4 wherein, guide means are attached to the housing back wall and project toward the front wall intermediate the openings of each aligned pair to enter the open ends of the filter elements as they are inserted to guide each filter element open end to sealing position about one of the openings in the housing back wall.

7. A filter as claimed in claim 6 wherein, there are releasable latching means carried by the housing front wall to engage the closed ends of the filter elements to hold the filter elements in position in the housing.

References Cited by the Examiner

UNITED STATES PATENTS

| | | | |
|---|---|---|---|
| 371,560 | 10/87 | Edington | 292—256.73 |
| 740,141 | 9/03 | Keil | 292—218 |
| 1,088,952 | 3/14 | Wilkey | 55—350 |
| 1,370,147 | 3/21 | Mueller | 210—497 X |
| 3,016,984 | 1/62 | Getzin | 55—492 |

HARRY B. THORNTON, *Primary Examiner.*